(12) United States Patent
Hashimoto

(10) Patent No.: US 11,526,961 B2
(45) Date of Patent: Dec. 13, 2022

(54) INFORMATION PROCESSING METHOD, IMAGE PROCESSING APPARATUS, AND STORAGE MEDIUM THAT SELECTIVELY PERFORM UPSAMPLING TO INCREASE RESOLUTION TO IMAGE DATA INCLUDED IN ALBUM DATA

(71) Applicant: CANON KABUSHIKI KAISHA, Tokyo (JP)

(72) Inventor: Yoshinori Hashimoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 16/925,418

(22) Filed: Jul. 10, 2020

(65) Prior Publication Data

US 2021/0012456 A1   Jan. 14, 2021

(30) Foreign Application Priority Data

Jul. 10, 2019   (JP) .............................. JP2019-128424

(51) Int. Cl.
| | | |
|---|---|---|
| *G06T 3/40* | (2006.01) | |
| *H04N 1/00* | (2006.01) | |
| *G06V 20/00* | (2022.01) | |
| *G06V 40/16* | (2022.01) | |

(52) U.S. Cl.
CPC .............. *G06T 3/40* (2013.01); *G06V 20/00* (2022.01); *G06V 40/161* (2022.01); *H04N 1/00137* (2013.01); *H04N 1/00196* (2013.01); *H04N 1/00244* (2013.01); *G06T 2200/24* (2013.01)

(58) Field of Classification Search
CPC ....... G06T 3/40; G06T 2200/24; G06T 11/00; G06V 20/00; G06V 40/161; G06V 10/225; G06V 10/993; H04N 1/00137; H04N 1/00196; H04N 1/00244
USPC ......................................................... 382/254
See application file for complete search history.

(56) References Cited

U.S. PATENT DOCUMENTS

| | | | | |
|---|---|---|---|---|
| 8,509,488 B1 * | 8/2013 | Enge | ................... | G01C 21/3623 |
| | | | | 701/55 |
| 2006/0271688 A1 * | 11/2006 | Viger | .................... | H04L 63/101 |
| | | | | 709/227 |
| 2008/0068446 A1 * | 3/2008 | Barkley | ............... | H04N 19/187 |
| | | | | 348/14.07 |
| 2009/0015710 A1 * | 1/2009 | Hirasawa | ............... | H04N 5/917 |
| | | | | 348/E7.001 |

(Continued)

FOREIGN PATENT DOCUMENTS

| | | | | |
|---|---|---|---|---|
| JP | 2007-194966 A | | 8/2007 | |
| JP | 2008535098 | * | 8/2008 | ............. G06F 13/00 |
| JP | 2016020084 | * | 2/2016 | |

*Primary Examiner* — Jerome Grant, II
(74) *Attorney, Agent, or Firm* — Venable LLP

(57) ABSTRACT

An album creation application displays an image arrangement screen and an image selection screen, and image data selected by a user from among an image group is arranged in an image slot selected by the user on the image arrangement screen. Each of the image data, which is arranged in the respective image slots included in album data for which an order is confirmed, is analyzed so as to determine whether or not each of the image data is a target of high quality printing. Based on the analysis result, upsampling for increasing the resolution is selectively performed to the image data included in the album data. The album data is sent to an image printer.

16 Claims, 12 Drawing Sheets

(56) References Cited

U.S. PATENT DOCUMENTS

| | | | |
|---|---|---|---|
| 2011/0164676 A1* | 7/2011 | Ozawa | H04N 21/41407 375/E7.026 |
| 2013/0120794 A1* | 5/2013 | Kamoi | G06K 15/1821 358/1.15 |
| 2014/0212058 A1* | 7/2014 | Yokose | H04N 19/34 382/238 |
| 2015/0189166 A1* | 7/2015 | San Pedro Wandelmer | H04N 5/23293 348/333.11 |
| 2015/0286444 A1* | 10/2015 | Sinn | G06F 3/1288 358/1.9 |
| 2018/0174275 A1* | 6/2018 | Bourdev | G06V 10/82 |
| 2018/0365799 A1* | 12/2018 | Yokomizo | H04N 5/217 |
| 2020/0311982 A1* | 10/2020 | Ogawa | G06T 5/002 |
| 2021/0051244 A1* | 2/2021 | Kelly | H04N 19/30 |
| 2021/0192686 A1* | 6/2021 | Kim | H04N 7/0117 |
| 2021/0234941 A1* | 7/2021 | Ökvist | G06F 16/5854 |
| 2021/0304363 A1* | 9/2021 | Makihira | G16H 30/20 |
| 2021/0390696 A1* | 12/2021 | Iwase | H04N 7/18 |

* cited by examiner

INFORMATION PROCESSING METHOD, IMAGE PROCESSING APPARATUS, AND STORAGE MEDIUM THAT SELECTIVELY PERFORM UPSAMPLING TO INCREASE RESOLUTION TO IMAGE DATA INCLUDED IN ALBUM DATA

CROSS-REFERENCE TO RELATED APPLICATION

This application claims the benefit of Japanese Patent Application No. 2019-128424 filed Jul. 10, 2019, which is hereby incorporated by reference herein in its entirety.

BACKGROUND OF THE INVENTION

Field of the Invention

The present disclosure relates to a technology for creating album data.

Description of the Related Art

In recent years, in a case of creating a printed product such as a photo album from image data obtained by image-capturing with a digital camera, or the like, there has been an increasing need to create a printed product with a higher definition. As a method for creating a high-definition printed product, a method of using high quality image data with a high resolution, or a method of using image data of which the resolution is increased by performing image processing for increasing the resolution, which is referred to as upsampling, to the image data.

Furthermore, as a method for efficiently dealing with image data with a large data size, there is a method in which low quality image data is used for thumbnail images to be an album sample for the purpose of checking and high quality image data is used for actual printing to create a photo album (see Japanese Patent Laid-Open No. 2007-194966).

However, in order to print with image data, it is necessary to transfer image data from the terminal apparatus in which the image data is stored to the printing apparatus that performs printing, and the data transfer takes time since high quality image data has a large data size. On the other hand, it is conceivable to use low quality image data with a small data size for image data to be transferred and to perform upsampling for increasing the resolution of the transferred image data, so as to shorten the time for the data transfer. However, also in this case, with an increase in the amount of image data to which upsampling is performed, the processing time becomes longer.

SUMMARY OF THE INVENTION

The technology of the present disclosure relates to an information processing method including an image analyzing step for analyzing characteristics of each of a plurality of images to be used for album data, a first sending step for sending the plurality of images and information that is based on an analysis result of the image analyzing step, an image converting step for changing pixel counts of an image of which the characteristics satisfy a predetermined condition, based on the information sent in the first sending step, out of the plurality of images sent in the first sending step, and a second sending step for sending album data including the image with pixel counts changed in the image converting step, wherein the image analyzing step and the first sending step are executed by a first apparatus, and wherein the image converting step and the second sending step are executed by a second apparatus.

Further features of the present invention will become apparent from the following description of exemplary embodiments with reference to the attached drawings.

DESCRIPTION OF THE EMBODIMENTS

Hereafter, a printing apparatus and a printing method according to the technology of the present disclosure will be explained with reference to the drawings.
(Information Processing Apparatus)

Figure 1:
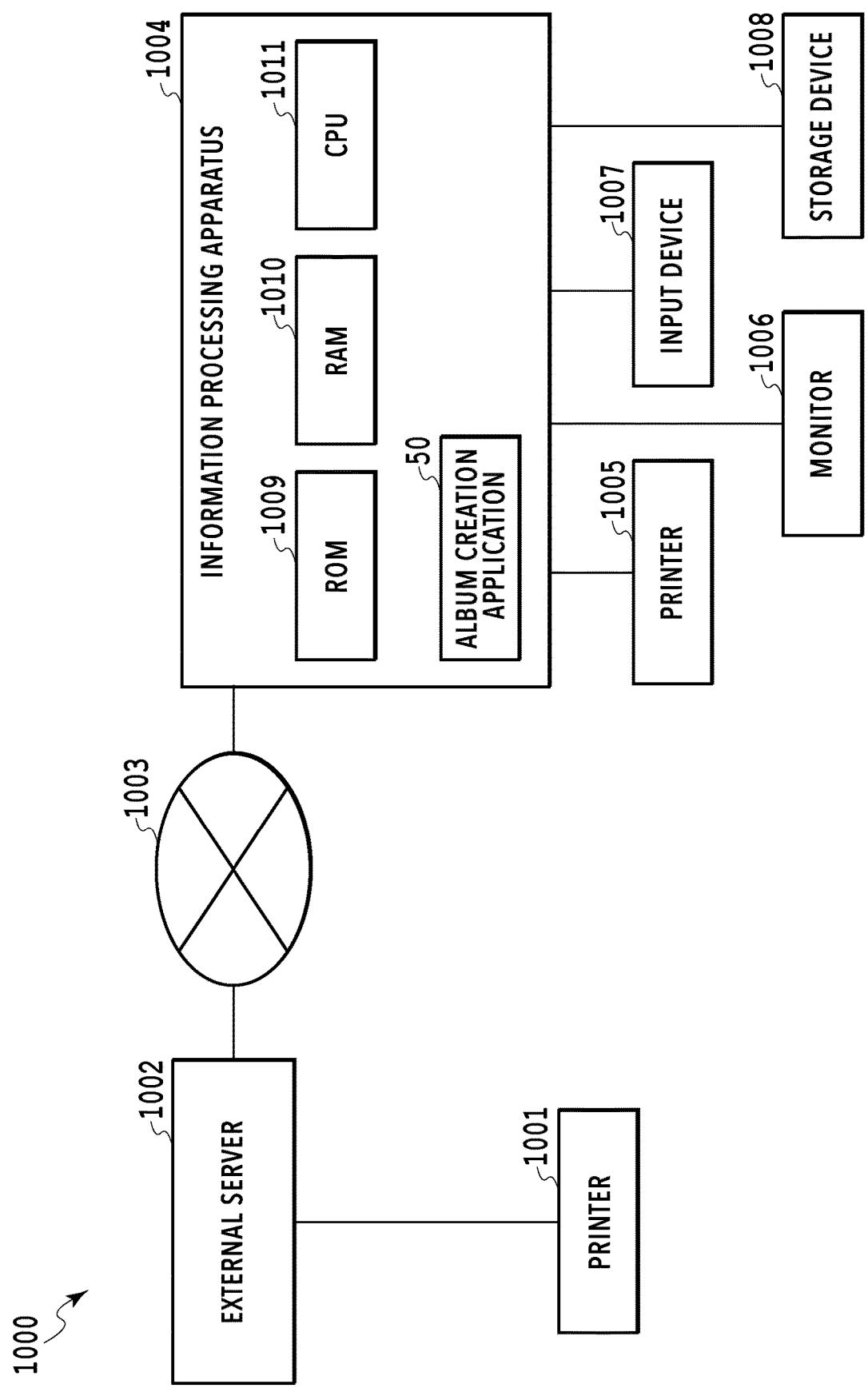
FIG. 1 is a configuration diagram of a print system.

FIG. 1 is a configuration diagram of an information processing system 1000 according to the technology of the present disclosure. First, with reference to FIG. 1, an explanation is given of the configuration of an information processing apparatus 1004 used in the technology of the present disclosure.

The information processing apparatus 1004 includes a ROM 1009, a RAM 1010, and a CPU 1011. Furthermore, the information processing apparatus 1004 includes an input/output interface (not illustrated in the drawings) for connecting to a network 1003 such as the Internet and to external devices such as a printer 1005, a monitor 1006, an input device 1007, and a storage device 1008.

The CPU 1011 is a central processing unit, which entirely controls the information processing apparatus 1004 by executing an operation system program (hereafter abbreviated as an OS) stored in the storage device 1008, the ROM 1009, or the RAM 1010. In addition, the CPU 1011 executes a program stored in the ROM 1009 or the RAM 1010 to perform calculation based on input data, process and output data, or control each hardware, so that each function of the information processing apparatus 1004 is implemented. The ROM 1009 is a read-only memory in which each program is stored. The RAM 1010 is a random access memory that is used as a work memory of the CPU 1011. However, in a case of a non-volatile RAM, it is possible to store each program.

The information processing apparatus 1004 includes an album creation application 50, which is stored in the ROM 1009, or the like, and, with the album creation application 50, the information processing apparatus 1004 is capable of generating album data, which corresponds to an album in which an image based on image data is arranged. Furthermore, the information processing apparatus 1004 is capable of outputting the generated album data to the printer 1005 as print data or uploading the generated album data to an external server 1002 via the network 1003. Note that, in the present disclosure, an album includes a photo album and a photo book.

The network 1003 is connected to the information processing apparatus 1004 and a transmission unit and a reception unit of the external server 1002, and the network 1003 is a communication network for transmitting respective information in that connection.

The external server 1002 includes an input/output interface (not illustrated in the drawings) for connecting to the printer 1001, and the printer 1001 is connected via the input/output interface.

Album data created by the information processing apparatus 1004 is uploaded to the external server 1002 via the network 1003. In a case when it is possible to print the uploaded album data, the external server 1002 outputs the uploaded album data to the printer 1001. For example, the external server 1002 may be an album order-reception/management server, so that, in a case when the user uploads album data created by the information processing apparatus 1004 and performs a necessary procedure for purchasing an album, the album data is output by use of the printer 1001. Thereafter, the output printed product is bound and delivered to the user.

The printer 1005 is a printer for directly printing from the information processing apparatus 1004. An album may be printed by the printer 1005 owned by the user and connected to the information processing apparatus 1004, bound by the user, and finished into the album.

The monitor 1006 is a display device that displays image information output from the information processing apparatus 1004.

The input device 1007 is an input device such as a keyboard or a pointing device for the user to provide input to the information processing apparatus 1004. It is also possible that the input device 1007 is a device that is integrated with the monitor and is configured to provide input based on direct touching of the monitor.

The storage device 1008 is a storage device such as an HDD or SSD that stores image data, a template having an image arrangement frame (slot) for arranging an image, etc.

Note that, in the block diagram illustrated in FIG. 1, the information processing apparatus 1004 is described as a component separate from the monitor 1006, the input device 1007, and the storage device 1008. However, as for the information processing apparatus 1004, it is also possible that the monitor 1006, the input device 1007, and the storage device 1008 (which may be shared with the RAM of the information processing apparatus) are integrated with the information processing apparatus 1004 as components of the information processing apparatus 1004.

Printing Apparatus and Printing Method

First Embodiment

Figure 2:
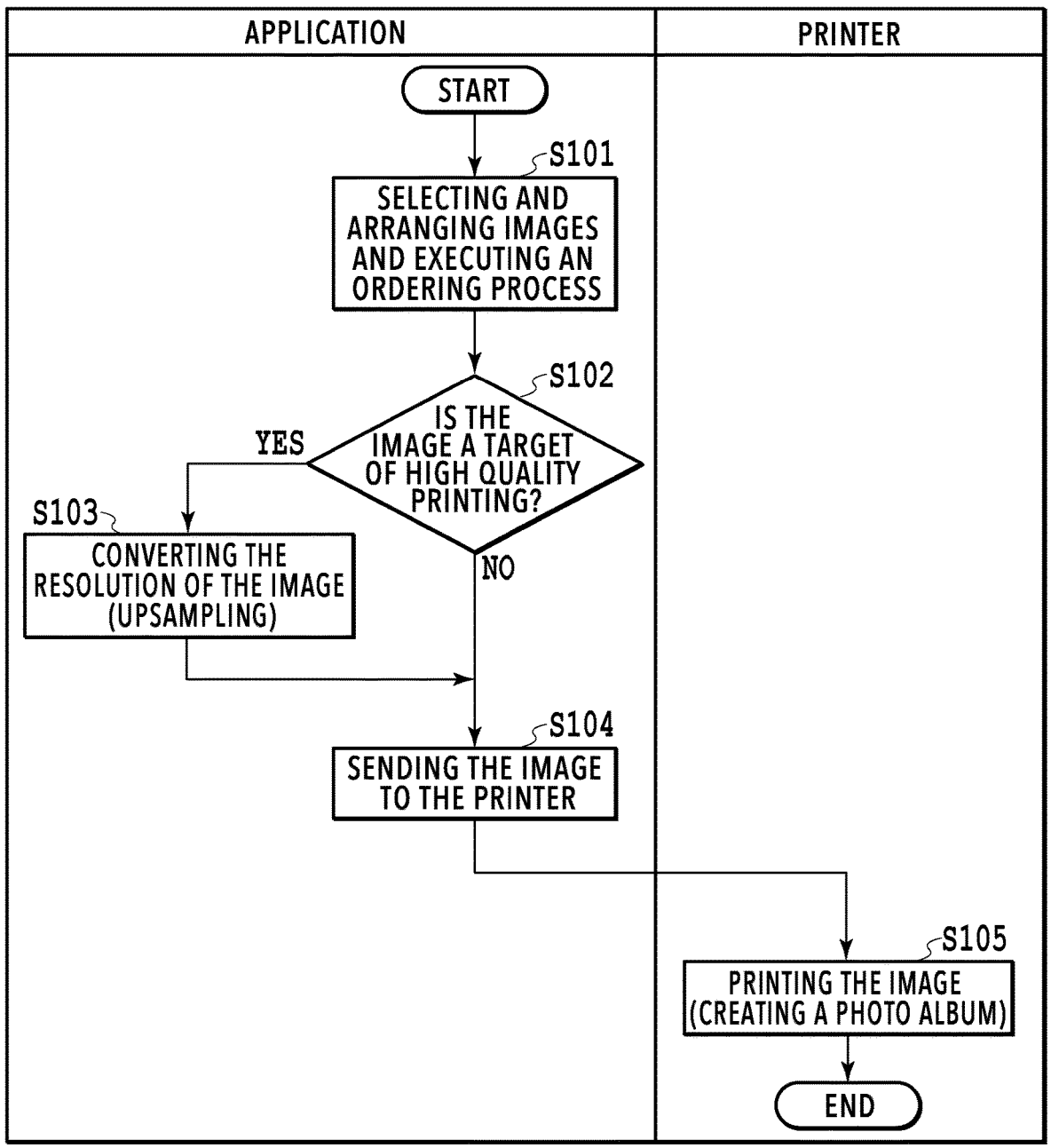
FIG. 2 is a flowchart of the first embodiment.
Figure 3:
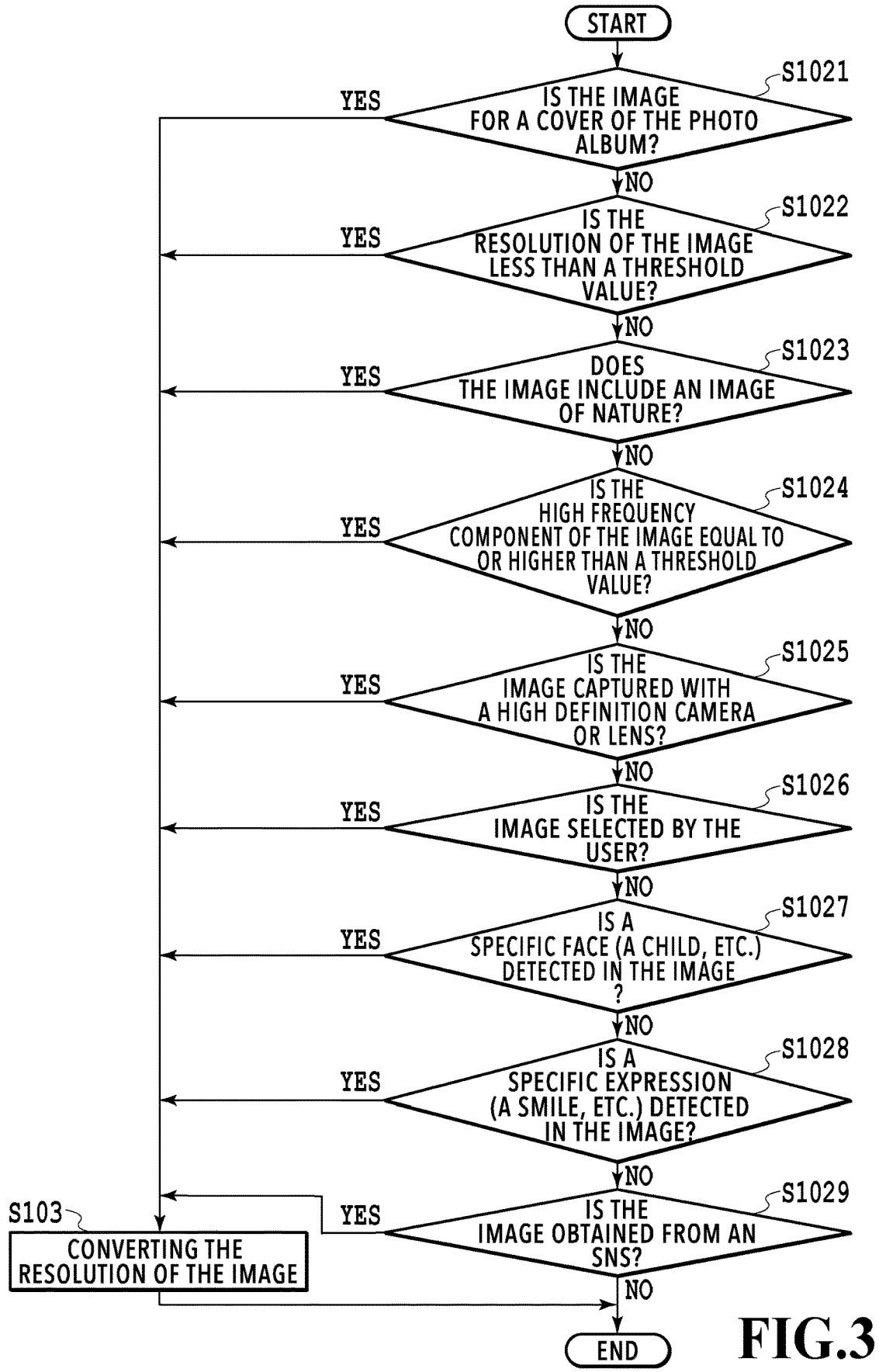
FIG. 3 is a flowchart of the first embodiment.
Figure 4:
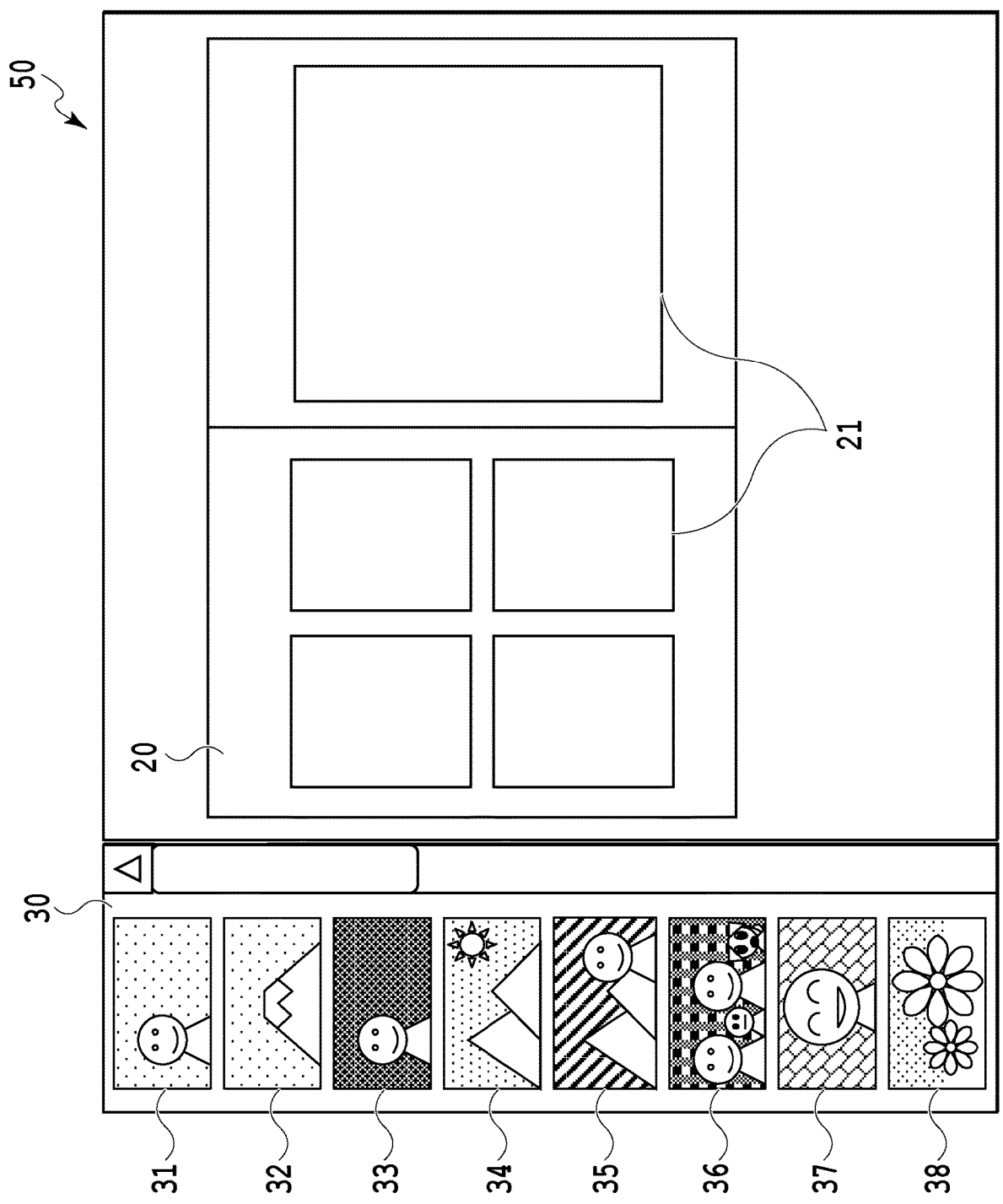
FIG. 4 is a diagram of a user interface (UI) for selecting and arranging images in an application of the first embodiment.
Figure 5:
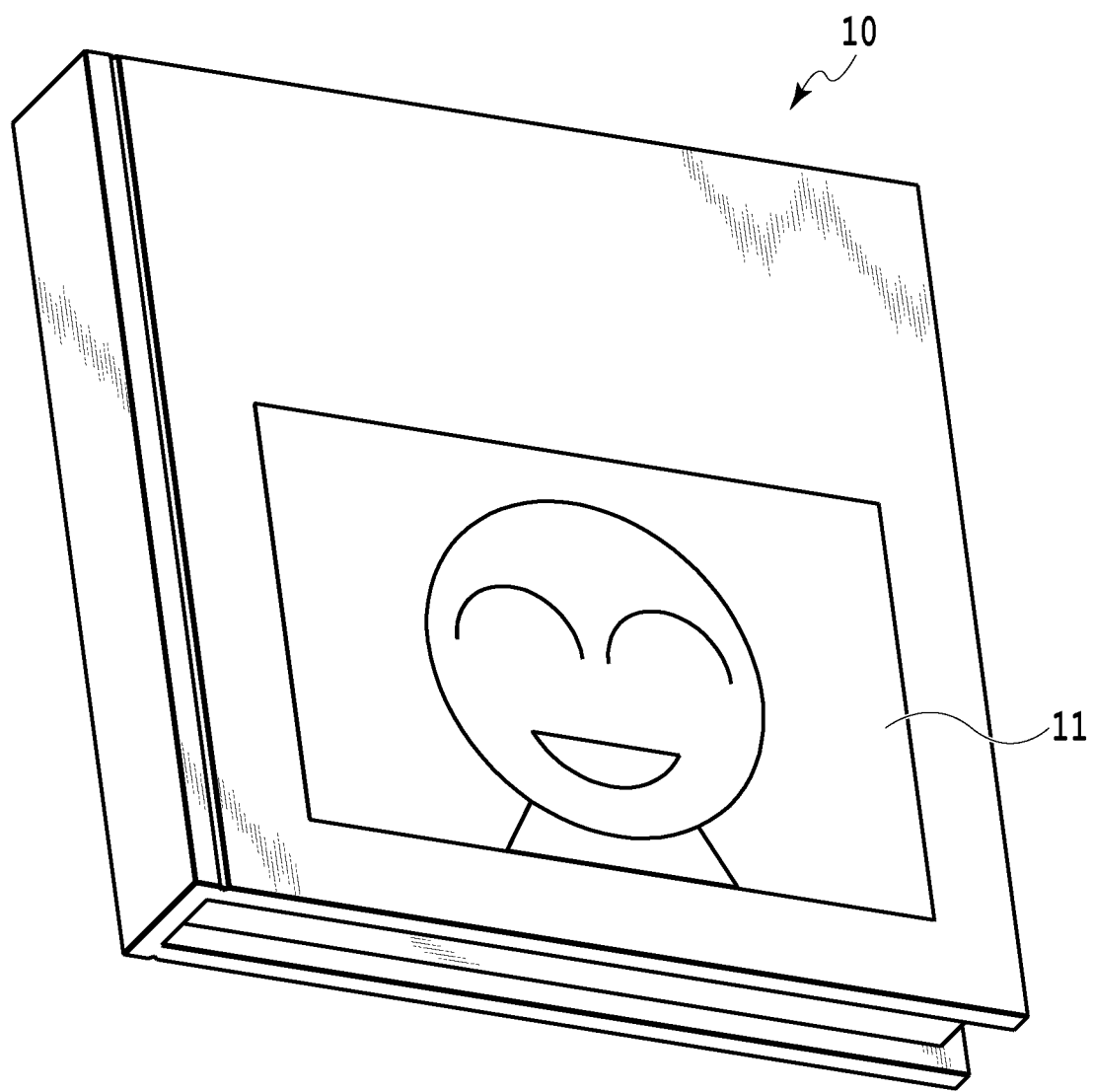
FIG. 5 is a schematic view of the front cover of an album.
Figure 6:
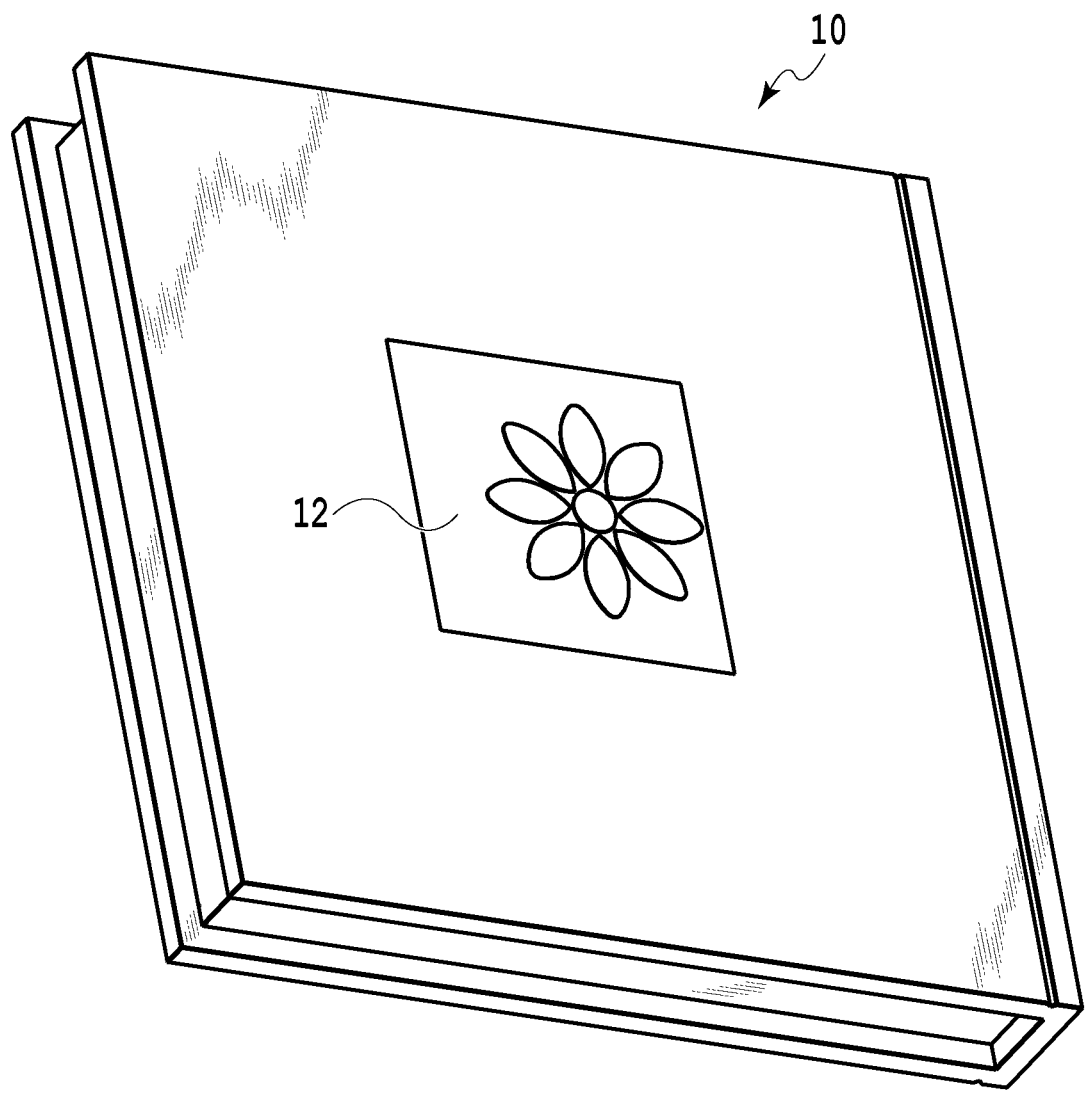
FIG. 6 is a schematic view of the back cover of an album.
Figure 7:
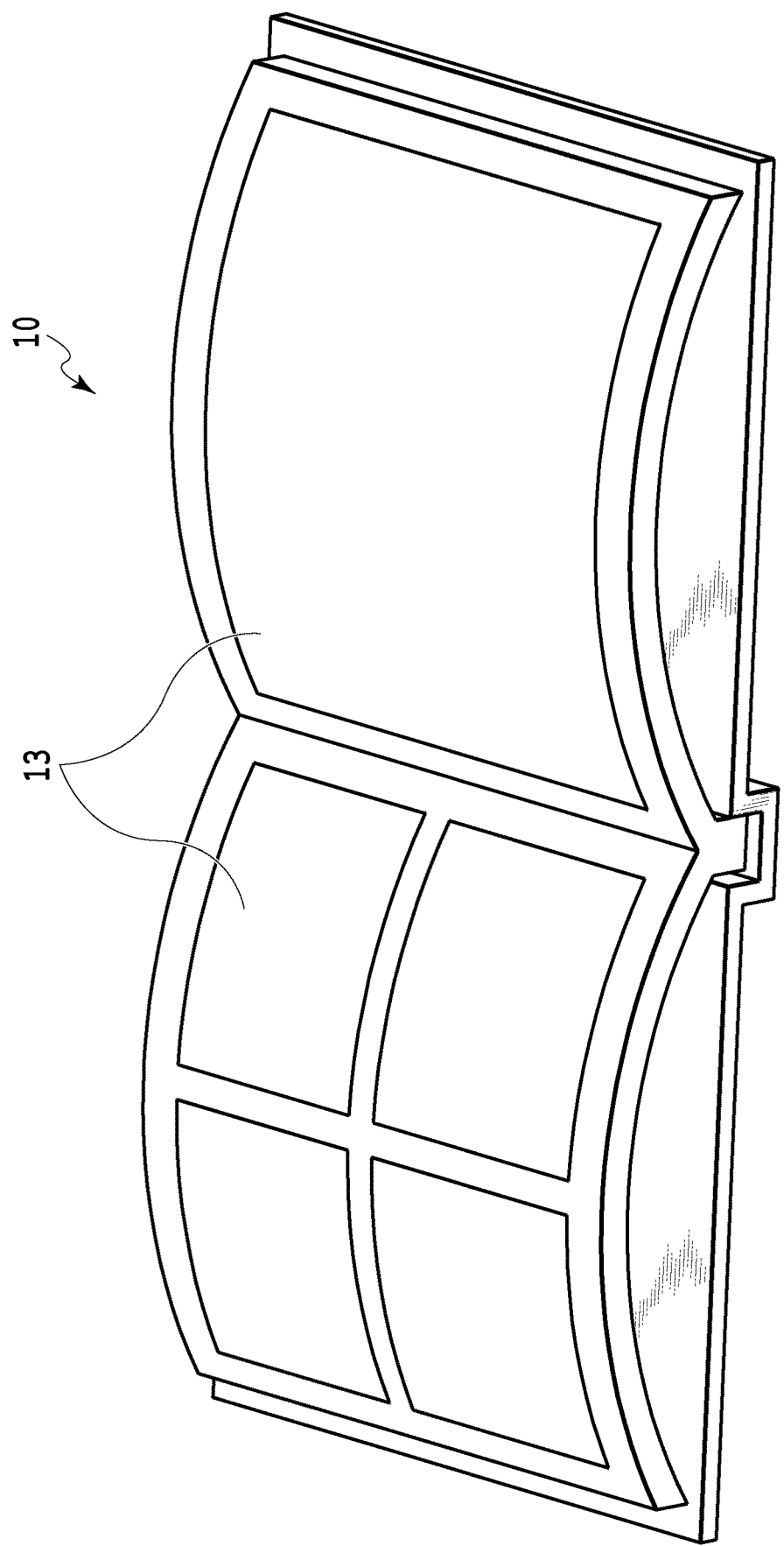
FIG. 7 is a schematic view of an album.

Next, an explanation is given of an album data generation method of the present embodiment with reference to FIGS. 1 through 7. Here, FIG. 2 is a flowchart of the information processing system of the present embodiment, and FIG. 3 is a flowchart describing details of a conditional branch of FIG. 2. Furthermore, FIG. 4 is a schematic view of an image selection/arrangement UI of the album creation application 50, and FIGS. 5 through 7 are schematic views of an album, which is an example of a product. FIG. 5 is a perspective view of an album 10 viewed from the front side, FIG. 6 is a perspective view of the album 10 viewed from the rear side, and FIG. 7 is a perspective view of the album 10 in an opened state. Further, reference sign 11 denotes an image arranged on the front cover, reference sign 12 denotes an image arranged on the back cover, and reference sign 13 denotes an image arranged on an inner page.

In the present embodiment, for creating the album 10, the user selects and arranges image data by use of the album creation application 50 in the information processing apparatus 1004, then the album creation application 50 generates an album data and uploads the album data to the external server 1002.

Here, in FIG. 4, reference sign 20 denotes an image arrangement screen (image layout screen), reference sign 21 denotes each of the image slots in which an image is arranged, reference sign 30 denotes an image selection screen, and reference signs 31 through 38 denote selectable image group.

With reference to the flowchart in FIG. 2 and the UI of the album creation application 50 in FIG. 4, an explanation is given of the procedure for creating such an album.

First, in S101, the album creation application 50 displays the image arrangement screen 20 and the image selection screen 30, and the image data selected by the user from among multiple images is arranged in the image slot 21 selected by the user on the image arrangement screen 20. In this way, the album creation application 50 creates album data. The image data arranged in the image slot 21 can be checked by the user on a preview screen and edited by the user as necessary. The editing includes, for example, a process of switching the arrangement positions of images in the album, a process of replacing an image arranged in the album with another image that is not arranged in the album, and the like.

Furthermore, after image data is selected and arranged, in a case when the user places an order, the image data and the image slots corresponding thereto are confirmed. Therefore, in S101, the album creation application 50 executes an ordering process for ordering the album. Specifically, as the ordering process, the album creation application 50 executes a process for accessing a website for performing a payment process for printing the album, entering a delivery destination, and the like. For the access, it is also possible that the album creation application 50 transmits the URL of the website to a web browser, so that the web browser accesses the website. Then, in a case when various kinds of information such as a delivery destination and information for payment are entered on the above-described website and the user presses an order button, the order is confirmed.

In a case when the order is confirmed by the above-described ordering process, the processing proceeds to S102. In S102, the album creation application 50 analyzes each of the image data arranged in the respective image slots 21 included in the album data for which the order is confirmed, so as to determine whether each of the image data is a target of high quality printing or not. Furthermore, based on whether a predetermined condition, which will be explained later with reference to FIG. 3, is satisfied or not, in a case when it is determined that the image data is a target of high quality printing, the processing proceeds to S103, and, in a case when it is determined that the image data is not a target of high quality printing, the processing proceeds to S104.

In S103, the album creation application 50 performs upsampling to increase the resolution (increase the pixel counts) of the image data determined as a target of high quality printing from among the image data included in the album data, based on the analysis result. Various methods can be used as the method for upsampling in S103. For example, in a case of performing upsampling so as to double the pixel counts in each of the vertical and horizontal directions, a pixel having an average pixel value (luminance value, or the like) of two adjacent pixels in the image before the upsampling is set as the pixel between the two pixels. Furthermore, a pixel having an average pixel value (luminance value, or the like) of four pixels consisting of two pixels arranged in the vertical direction and two pixels arranged in the horizontal direction in the image before the upsampling is set as the center pixel of the four pixels. The same applies to upsampling in the following embodiments as well.

In S104, the album creation application 50 sends the album data to an image printer, such as the printer 1001.

Lastly, in S105, the printer 1001 performs printing by use of the received album data, so as to complete an album as a product.

Note that, as a method of upsampling for increasing the resolution (increasing the pixel counts) of image data, filtering with the use of deep learning is performed to emphasize edges. Additionally, although the analysis is performed after placing an order in the present embodiment as an example, it is also possible that the analysis is performed before placing an order, such as at the timing when the image data is arranged in the image slots 21 by the user.

Here, with reference to FIG. 3, an explanation is given of details of the image analysis step of S102, which corresponds to characteristics of the technology of the present disclosure. FIG. 3 is a flowchart describing details of the image analysis step of S102 in FIG. 2, in which nine examples of a specific determination condition used in the image analysis for the characteristics of image data are presented. That is, the determination process illustrated in FIG. 3 is repeatedly executed for each of the multiple images arranged in the album in S101.

First, in S1021, the album creation application 50 determines whether or not the determination target image data is used as the image 11, which is for the front cover, or the image 12, which is for the back cover. In a case of YES in S1021, the processing proceeds to S103, so that an image conversion is performed for upsampling the image data as described above. Since the image 11 for the front cover and the image 12 for the back cover are arranged at such locations that are most appealing to the user, the benefit of improving image quality is easily realized. Further, since the number of images is small, the effect in terms of increase in the data size due to the improvement of image quality is small as well. Therefore, the advantage of using high resolution image data as the images is great. In a case when it is determined in S1021 that the determination target image data is not image data for a cover (front cover or back cover), the processing proceeds to S1022.

In S1022, the album creation application 50 determines whether or not the resolution of the image data of the image enlarged or reduced in size according to the size of the image slot 21 in which the image data is arranged is less than a predetermined threshold value. In a case of YES in S1022, the processing proceeds to S103, so that an image conversion is performed for upsampling the image data as described above. In the present embodiment, for example, the threshold value for the resolution is set to 300 dpi for the analysis, so as to improve the image quality by upsampling image data of less than 300 dpi into 300 dpi. For example, in a case when the resolution of the image 31 in FIG. 4 is 150 dpi at the timing of being arranged in an image slot 21, upsampling is performed so that the resolution becomes 300 dpi as described above. In a case when it is determined in S1022 that the resolution of the image data arranged in the image slot 21 is equal to or higher than the predetermined threshold value, the processing proceeds to S1023.

In S1023, the album creation application 50 determines whether or not the image data arranged in the image slot 21 includes an image of nature. In a case of YES in S1023, the processing proceeds to S103, so that an image conversion is performed for upsampling the image data as described above. In the present embodiment, in a case when the color space of the image data is any of 8 bit Gray, 24 bit RGB, and 48 bit RGB, it is determined that the image data includes an image of nature, and therefore upsampling is performed so that the resolution of the image data is doubled, so as to improve the image quality. For example, in a case when the resolution of the image 32 in FIG. 4 is 300 dpi at the timing of being arranged in an image slot 21 and the color space thereof is any one of the above-described color spaces, upsampling is performed so that the resolution becomes 600 dpi as described above. In a case when the image data does not include an image of nature in S1023, the processing proceeds to S1024. The determination in S1023 is performed because the effect of upsampling is relatively perceivable in a case of an image of nature.

In S1024, the album creation application 50 analyzes the frequency component of the image data and determines whether or not the high frequency component thereof is equal to or higher than a threshold value. In a case of YES in S1024, the processing proceeds to S103, so that an image conversion is performed for upsampling the image data as described above. For example, in a case when the high frequency component of the image data 33 in FIG. 4 is equal to or higher than the threshold value, upsampling is performed so as to improve the image quality. Since upsampling is particularly effective for image data in which a variation of pixel values are densely arranged, the effect of improving the image quality can be realized more easily. Note that, as an example of the method for analyzing the frequency component, Fourier transform is performed, and the analysis is performed based on the difference in pixel values near an edge portion. In a case when the high frequency component of the image data is less than the threshold value in S1024, the processing proceeds to S1025. Note that, as for a specific method for the determination in S1024, various methods can be used. For example, the pixel values of the determination target image are converted into frequency data, and, in a case when the ratio of the data amount with a predetermined frequency or higher in the data amount of the entire data is equal to or higher than a predetermined ratio, it is determined that the high frequency component of the image is equal to or higher than the threshold value.

Next, in S1025, the album creation application 50 analyzes photographic information (Exif information) of the image, so as to determine whether or not the image data is captured under high definition image-capturing conditions. In a case of YES in S1025, the processing proceeds to S103, so that an image conversion is performed for upsampling the image data as described above. Here, the image-capturing conditions used for the analysis are information recorded in the image data at the time of image-capturing, and the image-capturing conditions include the type and the manufacturer of the camera used for image-capturing, the type of lens, the image-capturing mode (automatic or manual), and the like. The analysis is performed based on such photographic information (Exif information) stored in the image data. For example, it is possible that, in a case when the image 34 in FIG. 4 is an image captured with a predetermined camera or a predetermined lens that is one of a specific series provided by a specific vendor, upsampling is performed so as to improve the image quality as described above. In a case when it is determined in S1025 that the image data is not captured under the high definition image-capturing conditions, the processing proceeds to S1026.

Next, in S1026, the album creation application 50 determines whether or not the image data is selected by the user as a target of improving the image quality. In a case of YES in S1026, the processing proceeds to S103, so that an image conversion is performed for upsampling the image data as described above. For example, in a case when the user likes the image data 35 in FIG. 4 and the image data 35 is selected as a target of improving the image quality, upsampling is performed so as to improve the image quality. Note that, whether or not the image data is selected by the user as a target of improving the image quality may be changed by use of a check box provided for each image slot 21 on the image layout screen 20 or may be changed on another screen. In a case when it is determined in S1026 that the image data is not selected by the user as a target of improving the image quality, the processing proceeds to S1027.

Next, in S1027, the album creation application 50 determines whether or not the image data includes a specific face image, which is set in advance. In a case of YES in S1026, the processing proceeds to S103, so that an image conversion is performed for upsampling the image data as described above. For example, in a case when the face of a child, a pet, or the like, is set as the specific face, image data including those face images is identified as a target of upsampling, and upsampling is performed so as to improve the image quality as described above. In a case when it is determined in S1027 that the image data does not include the specific face image, the processing proceeds to S1028.

Next, in S1028, the album creation application 50 determines whether or not the image data includes a person with a specific expression, which is set in advance. In a case of YES in S1026, the processing proceeds to S103, so that an image conversion is performed for upsampling the image data as described above. For example, in a case when an expression such as a smile is set as the specific expression, image data including a face image with that expression is identified as a target of upsampling, and upsampling is performed so as to improve the image quality as described above. In a case when it is determined in S1028 that the image data does not include the specific expression, the processing proceeds to S1029.

Next, in S1029, the album creation application 50 determines whether or not the image data is obtained from a social networking service (SNS). In a case of YES in S1026, the processing proceeds to S103, so that an image conversion is performed for upsampling the image data as described above. For example, in a case when the image data arranged in an image slot 21 in FIG. 4 is obtained from an SNS, the image data is identified as a target of upsampling, and upsampling is performed so as to improve the image quality as described above. Since it is highly likely that image data uploaded to an SNS by the user is an image that the user particularly likes, there is a great advantage in improving the image quality of such image data. Note that it is possible that such an SNS includes a photograph sharing application, which is represented by Facebook (registered trademark) or Instagram (registered trademark). The album creation application 50 of the present embodiment has a function of obtaining image data from an SNS via the network 1003.

Lastly, as for image data that does not satisfy any of the above-described determination conditions based on the analysis, the processing proceeds to S104 without image conversion, so that the image data is incorporated with the original resolution into album data and sent to the image printer.

Accordingly, since only image data determined as a target for improving the image quality is converted into a high resolution, it is possible to optimize the size of the entire image data.

Note that, as for the order of the above-described nine conditions for analysis, it is possible to create an album with a high definition and high usability in a case when the order of the present embodiment is applied. That is, the first two steps S1021 and S1022 represent the characteristics involved in creating an album and related directly to creating a high definition album. Furthermore, since automatic detection can be performed according to setting conditions in the subsequent steps S1023 to S1025, in a case when such determinations are performed in earlier conditional branches, it is possible to create an album with high usability without prompting the user to make unnecessary selections. Furthermore, since the determinations can be performed according to given selections by the user in S1026 through S1029, it is possible to create an album with high usability in consideration of the user's intention.

However, the order of the above-described nine conditions for analysis is not limited to as such, and the order may be changed to a given order, and unnecessary analysis conditions may be omitted.

As described above, in the information processing system according to the present embodiment, the image conversion (upsampling) for increasing the resolution is performed only to image data satisfying a predetermined condition, and the other image data is used as the original data without performing the image conversion. Accordingly, it possible to create a high definition album and shorten the processing time for transferring the album data and for the image conversion as well.

Note that, in the above example, the processes of S102 and S103 are executed for each image in the album after an order for the album is confirmed in S101. That is, the processes of S102 and S103 are executed for images confirmed to be the printing targets. Therefore, for example, it is possible to prevent the processing in S102 and S103 from being performed in vain in such a way as the process of S103 is executed for an image but the image is excluded from the printing targets since the image is replaced with another image.

On the other hand, for example, it is also possible that the processes of S102 and S103 are executed in a state when images can be replaced. In this case, after images are firstly selected and arranged in S101 and then the process of S102 (as well as the process of S103, depending on the determination result of S102) is executed for each image, an album in which the images after the upsampling in S103 are arranged is displayed as a preview. Then, in a case when an image is replaced, the process of S102 (as well as the process of S103, depending on the determination result of S102) is executed for the image after the replacement. With this processing, it is possible for the user to grasp the finish of the album more specifically because of the displayed preview in which the results of the upsampling are reflected. Furthermore, in the case when an image is replaced, it is possible to display a preview in which the result of the upsampling for the image after the replacement is reflected as well.

Second Embodiment

Figure 8:
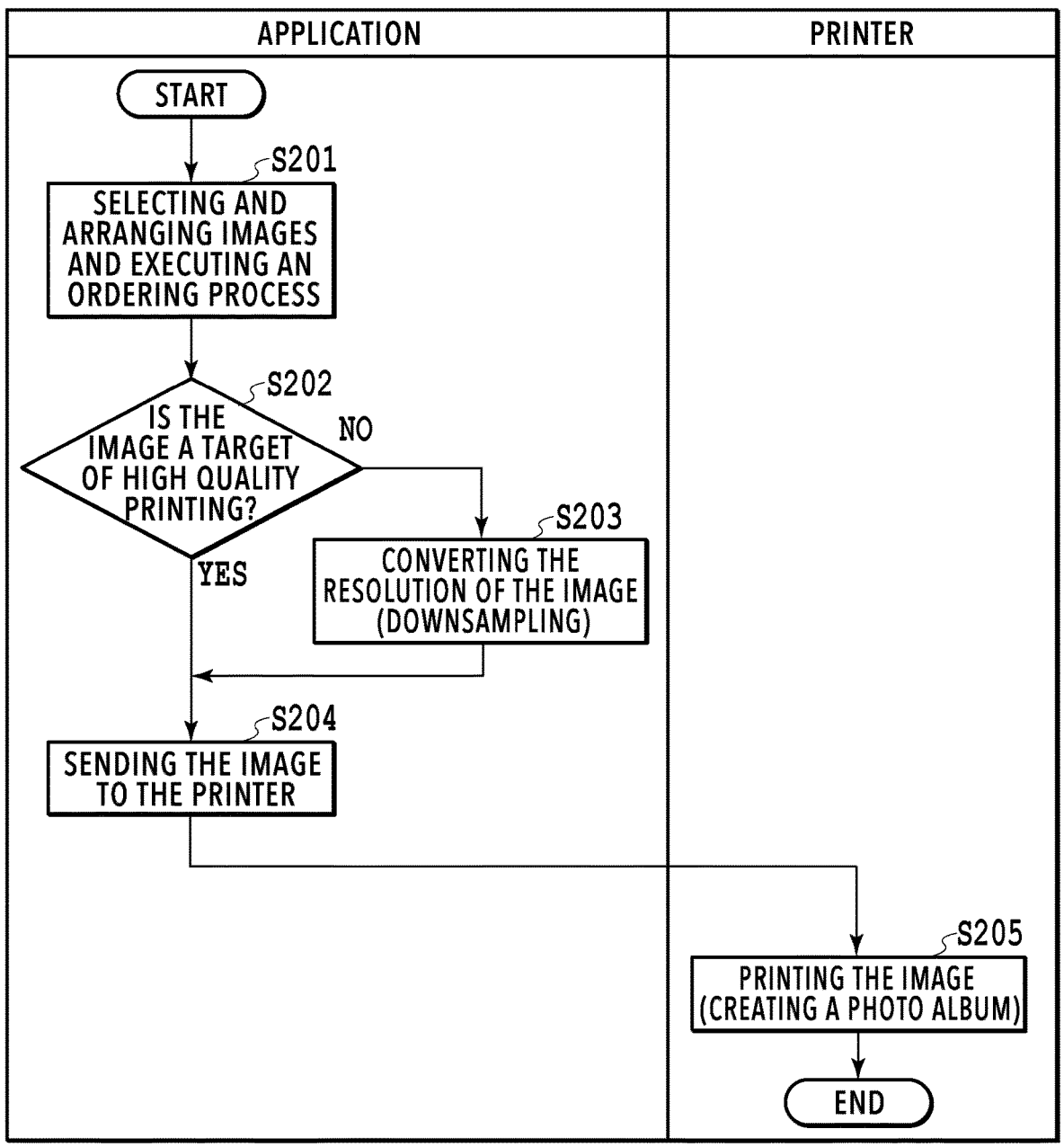
FIG. 8 is a flowchart of the second embodiment.

Next, an explanation is given of the second embodiment of the present disclosure with reference to the flowchart in FIG. 8 and the UI of the album creation application in FIG. 4. Here, since the present embodiment is the same as the first embodiment in terms of the configuration of the UI in FIG. 4, the detailed explanation thereof will be omitted.

In S201, as with S101, the album creation application 50 displays the image arrangement screen 20 and the image selection screen 30, and the image data selected by the user from among an image group is arranged in the image slot 21 selected by the user on the image arrangement screen 20. After image data is selected and arranged, in a case when the user places an order, the image data and the image slots corresponding thereto are confirmed.

Next, in S202, as with S102, the album creation application 50 analyzes each of the image data arranged in the respective image slots 21 included in the album data for which the order is confirmed, so as to determine whether each of the image data is a target of high quality printing or not. Furthermore, in a case when it is determined that the image data is not a target of high quality printing, the processing proceeds to S203, and, in a case when it is determined that the image data is a target of high quality printing, the processing proceeds to S204.

In S203, the album creation application 50 performs downsampling to selectively decrease the resolution (decrease the pixel counts) of image data included in the album data, based on the analysis result. Note that various methods can be used as the method for downsampling. For example, a method of decreasing the pixel counts by deleting pixels at a predetermined interval in an image, that is, thinning out pixels, may be used. The same applies to downsampling in the following embodiments as well.

In S204, the album creation application 50 sends the album data to the external server 1002 for an image printer.

Lastly, in S205, the external server 1002 performs printing with the printer 1001, which is an image printer, by use of the received album data, so as to complete an album as a product.

The method of analyzing whether the image data is a target of high quality printing or not in the image analysis step of S202, which corresponds to characteristics of the technology of the present disclosure, is the same as those that have already explained in the first embodiment with reference to FIG. 3, and therefore detailed explanations thereof are omitted. However, S202 is different from S102 of the first embodiment in the aspect that the processing proceeds to S203, in which the image conversion is performed, in a case of image data that is not a target of high quality printing, and the processing proceeds to S204, in which the image conversion is not performed, in a case of image data that is a target of high quality printing.

As described above, in the information processing system according to the present embodiment, the image conversion (downsampling) for decreasing the resolution is performed only to image data that is not a target of high quality printing, and the other image data is used as the original data without performing the image conversion. Accordingly, it possible to create a high definition album and to shorten the processing time for transferring the album data and for the image conversion as well.

Note that, in the second embodiment, as with the first embodiment, after an order for an album is confirmed in S201, the process of S202 (as well as the process of S203, depending on the determination result of S202) is executed for each image in the album. However, as with the first embodiment, for example, it is also possible that the processes of S202 and S203 are executed in a state when images can be replaced.

Third Embodiment

Figure 9:
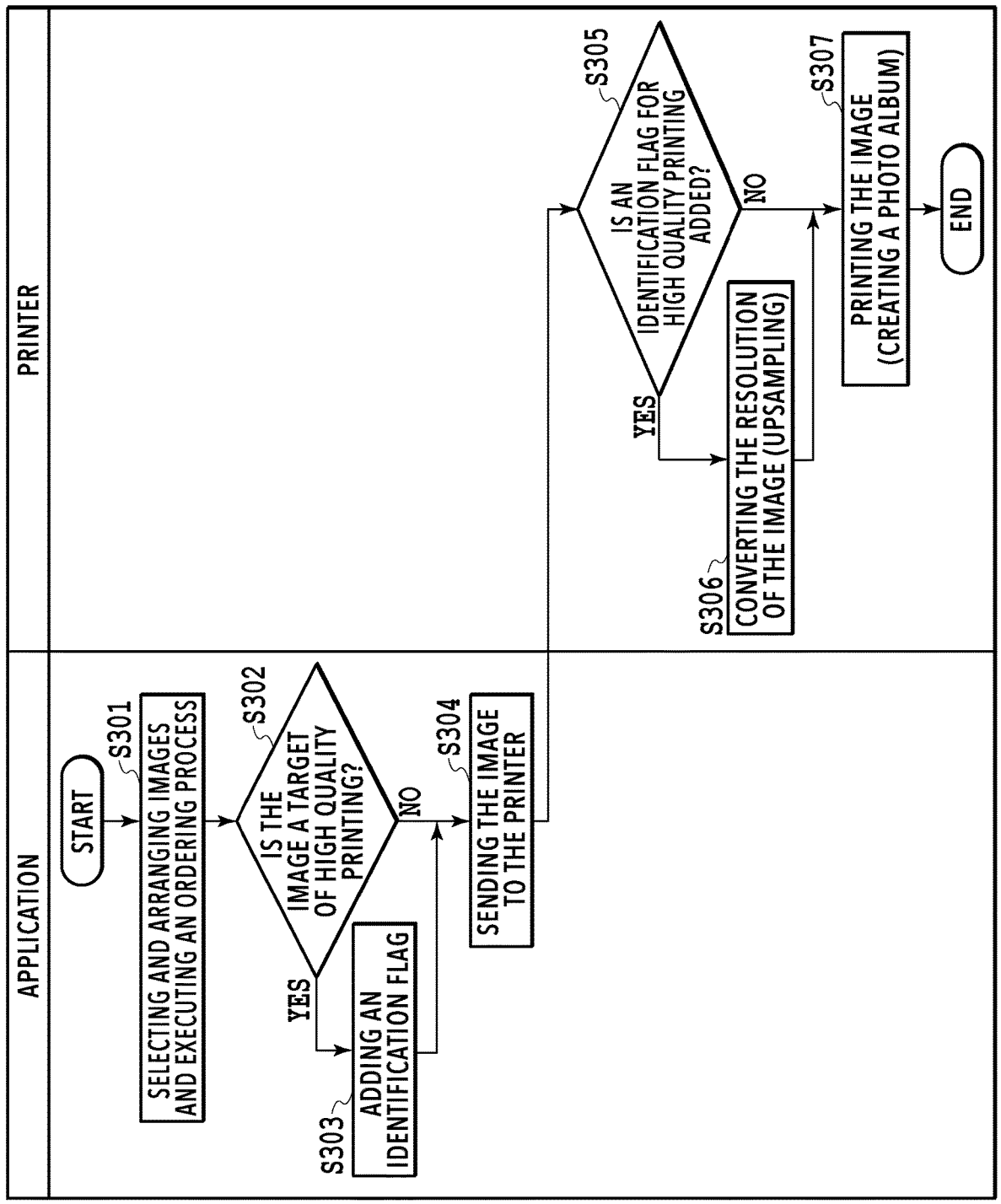
FIG. 9 is a flowchart of the third embodiment.

Next, an explanation is given of the third embodiment of the present disclosure with reference to the flowchart in FIG. 9 and the UI of the album creation application in FIG. 4. Here, since the present embodiment is the same as the first embodiment in terms of the configuration of the UI in FIG. 4, the detailed explanation thereof will be omitted.

The present embodiment is different from the first embodiment in the aspect that the step for the image conversion is performed by the image printer, not by the album creation application 50, after the analysis (S302) for determining whether an image is a target of high quality printing or not is performed.

First, in S301, as with S101, the album creation application 50 displays the image arrangement screen 20 and the image selection screen 30, and the image data selected by the user from among an image group is arranged in the image slot 21 selected by the user on the image arrangement screen 20. After image data is selected and arranged, in a case when the user places an order, the image data and the image slots corresponding thereto are confirmed.

In S302, as with S102, the album creation application 50 analyzes each of the image data arranged in the respective image slots 21 included in the album data for which the order is confirmed, so as to determine whether each of the image data is a target of high quality printing or not.

In S303, the album creation application 50 selectively provides an identification flag to image data included in the album data, based on the analysis result.

In S304, the album creation application 50 sends the album data to an image printer, such as the printer 1001 illustrated in FIG. 1, without performing image conversion to the image data.

Thereafter, in S305, an application installed on the printer 1001 checks the presence or absence of an identification flag in the image data group included in the sent album data.

In S306, the application installed on the printer 1001 selectively performs upsampling for increasing the resolution of an image to image data that is a target of high quality printing out of the entire image data included in the album data, based on the identification flag.

Lastly, in S307, the printer 1001 performs printing by use of the album data including the upsampled image, so as to complete an album as a product.

Details of the image analysis step in S302, which corresponds to characteristics of the technology of the present disclosure, is the same as those that have already explained in the first embodiment with reference to FIG. 3, and therefore detailed explanations thereof are omitted.

As described above, in the information processing system according to the present embodiment, the image conversion (upsampling) for increasing the resolution is performed only to an image that is a target of high quality printing, and the other image data is used as the original data without performing the image conversion. Accordingly, it possible to create a high definition album and to shorten the processing time for transferring the album data and for the image conversion as well.

Note that the present embodiment is configured to be implemented by the album creation application 50 included in the information processing apparatus 1004 and the application included in the printer 1001 cooperating with each other.

Note that, in the third embodiment, as with the first embodiment, after an order of an album is confirmed in S301, the process of S302 (as well as the process of S303, depending on the determination result of S302) is executed for each image in the album. However, as with the first embodiment, for example, it is also possible that the processes of S302 and S303 are executed in a state when images can be replaced.

Fourth Embodiment

Figure 10:
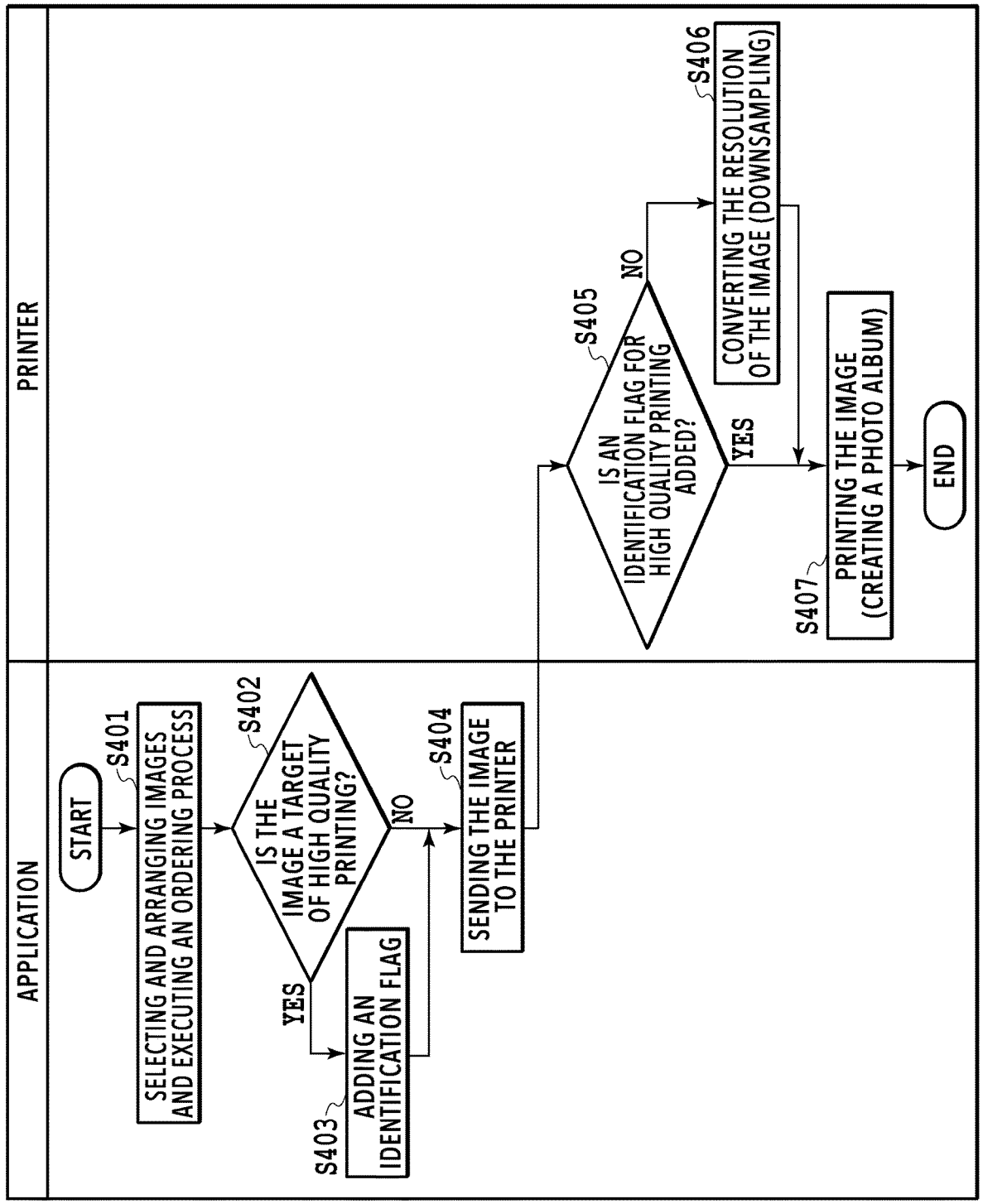
FIG. 10 is a flowchart of the fourth embodiment.

Next, an explanation is given of the fourth embodiment of the present disclosure with reference to the flowchart in FIG. 10 and the UI of the album creation application in FIG. 4. Here, since the present embodiment is the same as the first embodiment in terms of the configuration of the UI in FIG. 4, the detailed explanation thereof will be omitted.

The present embodiment is different from the third embodiment in terms of the method for the image conversion after the analysis (S402) for determining whether an image is a target of high quality printing.

First, in S401, as with S101, the album creation application 50 displays the image arrangement screen 20 and the image selection screen 30, and the image data selected by the user from among an image group is arranged in the image slot 21 selected by the user on the image arrangement screen 20. After image data is selected and arranged, in a case when the user places an order, the image data and the image slots corresponding thereto are confirmed.

In S402, as with S102 (S1021 through S1029 in FIG. 3), the album creation application 50 analyzes each of the image data arranged in the respective image slots 21 included in the album data for which the order is confirmed, so as to determine whether each of the image data is a target of high quality printing.

In S403, the album creation application 50 selectively provides an identification flag to image data that is a target of high quality printing, which is included in the album data, based on the analysis result.

In S404, the album creation application 50 sends the album data to an image printer, such as the printer 1001 illustrated in FIG. 1, without performing image conversion to the image data.

Thereafter, in S405, an application installed on the printer 1001 checks the presence or absence of an identification flag in the image data group included in the sent album data.

In S406, the application installed on the printer 1001 selectively performs downsampling for decreasing the resolution of an image to image data that is not a target of high quality printing out of the entire image data included in the album data, based on the identification flag.

Lastly, in S407, the printer 1001 performs printing by use of the album data including the downsampled image, so as to complete an album as a product.

Details of the image analysis step in S402, which corresponds to characteristics of the technology of the present disclosure, is the same as those that have already explained in the first embodiment with reference to FIG. 3, and therefore detailed explanations thereof are omitted.

As described above, in the information processing system according to the present embodiment, the image conversion (downsampling) for decreasing the resolution is performed only to an image that is not a target of high quality printing, and the other image data is used as the original data without performing the image conversion. Accordingly, it possible to create a high definition album and shorten the processing time for the image conversion and for printing as well.

In this way, the present embodiment is configured to be implemented by the album creation application 50 included in the information processing apparatus 1004 and the application included in the printer 1001 cooperating with each other.

Note that, in the fourth embodiment, as with the first embodiment, after an order of an album is confirmed in S401, the process of S402 (as well as the process of S403, depending on the determination result of S402) is executed for each image in the album. However, as with the first embodiment, for example, it is also possible that the processes of S402 and S403 are executed in a state when images can be replaced.

Fifth Embodiment

Figure 11:
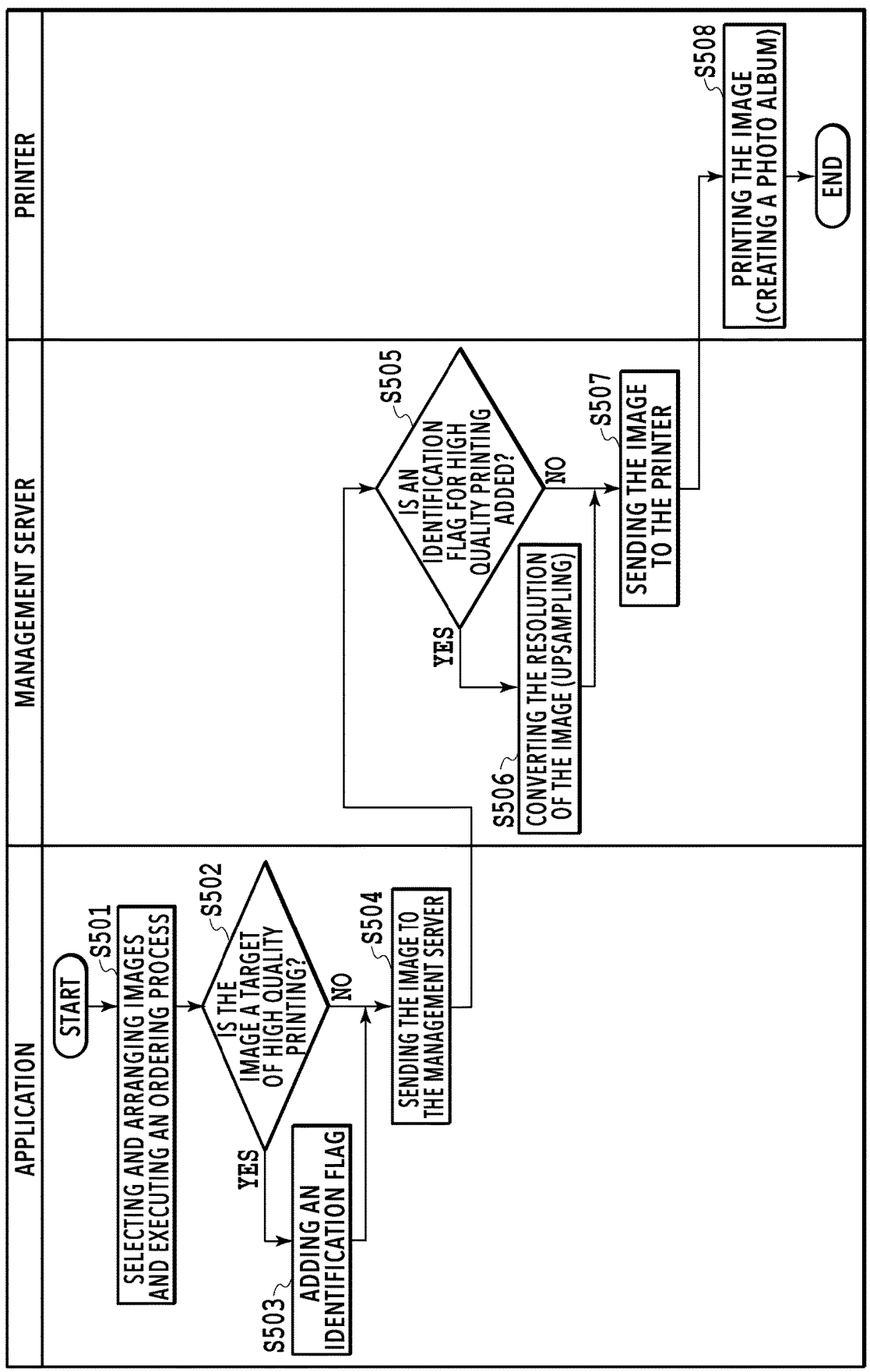
FIG. 11 is a flowchart of the fifth embodiment.

Next, an explanation is given of the fifth embodiment of the present disclosure with reference to the flowchart in FIG. 11 and the UI of the album creation application in FIG. 4. Here, since the present embodiment is the same as the first embodiment in terms of the configuration of the UI in FIG. 4, the detailed explanation thereof will be omitted.

The present embodiment is different from the third embodiment in the aspect that the step for the image conversion is performed by the external server (management server) 1002, which is an image processing apparatus, not by the printer, after the analysis (S502) for determining whether an image is a target of high quality printing is performed.

First, in S501, as with S101, the album creation application 50 displays the image arrangement screen 20 and the image selection screen 30, and the image data selected by the user from among an image group is arranged in the image slot 21 selected by the user on the image arrangement screen 20. After image data is selected and arranged, in a case when the user places an order, the image data and the image slots corresponding thereto are confirmed.

In S502, as with S102 (S1021 through S1029 in FIG. 3), the album creation application 50 analyzes each of the image data arranged in the respective image slots 21 included in the album data for which the order is confirmed, so as to determine whether each of the image data is a target image of high quality printing.

In S503, the album creation application 50 selectively provides an identification flag to image data that is a target of high quality printing, which is included in the album data, based on the analysis result.

In S504, the album creation application 50 sends the album data to the external server 1002, which is a management server, without performing image conversion to the image data.

Thereafter, in S505, an application installed on the external server 1002 checks the presence or absence of an identification flag in the image data group included in the sent album data.

In S506, the application installed on the external server 1002 selectively performs upsampling for increasing the resolution of an image to image data that is a target of high quality printing out of the entire image data included in the album data, based on the identification flag.

In S507, the application installed on the external server 1002 sends the album data, which includes the image data to which the image conversion has been selectively performed, to a printer such as the printer 1001.

Lastly, in S508, the printer 1001 performs printing by use of the album data including the upsampled image data, so as to complete an album as a product.

Details of the image analysis step in S502, which corresponds to characteristics of the technology of the present disclosure, is the same as those that have already explained in the first embodiment with reference to FIG. 3, and therefore detailed explanations thereof are omitted.

As described above, in the information processing system according to the present embodiment, the image conversion (upsampling) for increasing the resolution is performed only to an image that is a target of high quality printing, and the other images are used with the original resolutions without performing the image conversion. Accordingly, it possible to create a high definition album and shorten the processing time for transferring the album data and for the image conversion as well. Furthermore, by reducing the data size of the album data, it is possible to reduce the management cost since the storage capacity of the management server can be reduced.

In this way, the present embodiment is configured to be implemented by the album creation application 50 included in the information processing apparatus 1004 and the application included in the external server 1002, which is a management server, cooperating with each other.

Note that, in the fifth embodiment, as with the first embodiment, after an order of an album is confirmed in S501, the process of S502 (as well as the process of S503, depending on the determination result of S502) is executed for each image in the album. However, as with the first embodiment, for example, it is also possible that the processes of S502 and S503 are executed in a state when images can be replaced.

Sixth Embodiment

Figure 12:
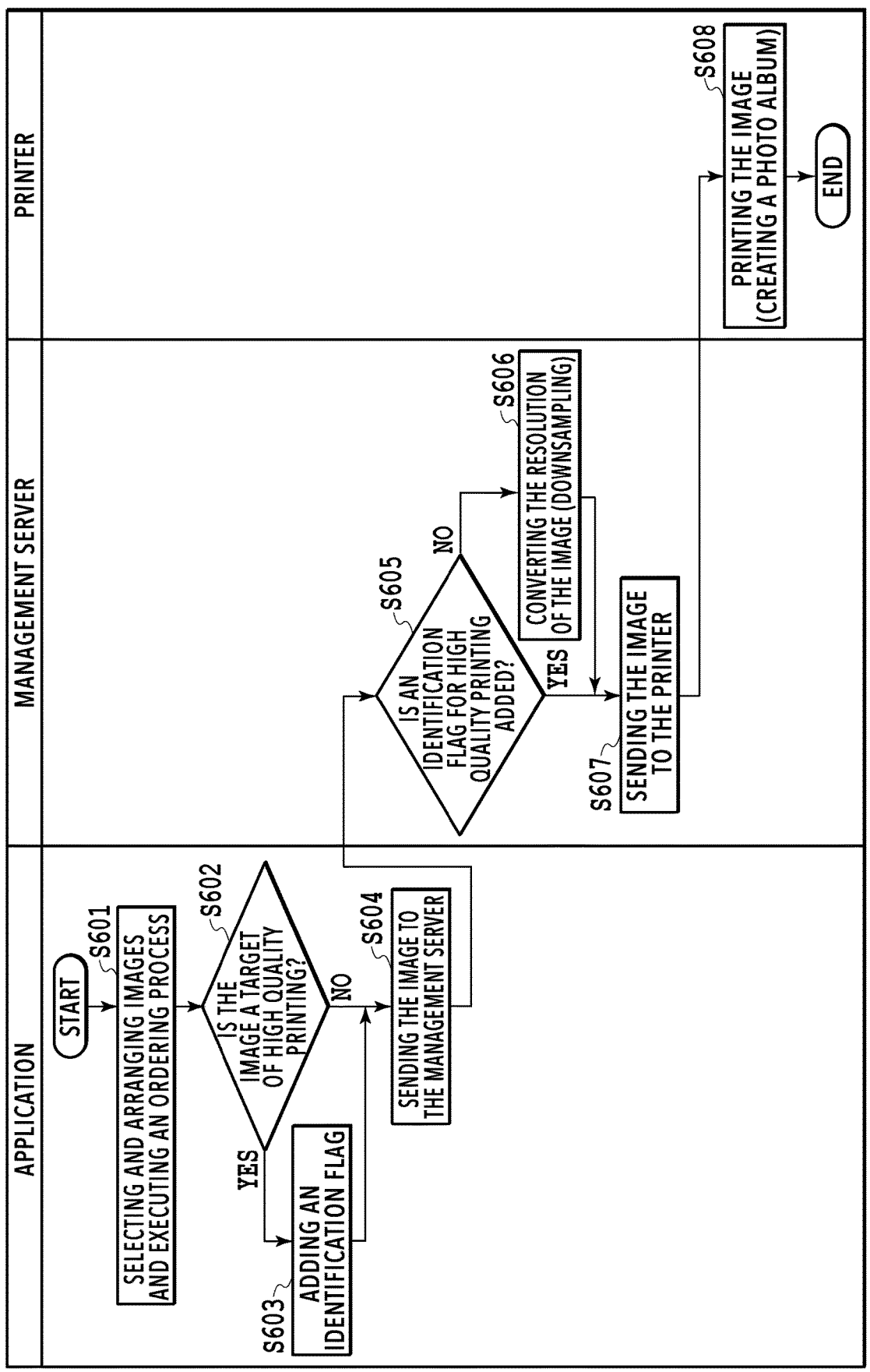
FIG. 12 is a flowchart of the sixth embodiment.

Next, an explanation is given of the sixth embodiment of the present disclosure with reference to the flowchart in FIG. 12 and the UI of the album creation application in FIG. 4. Here, since the present embodiment is the same as the first embodiment in terms of the configuration of the UI in FIG. 4, the detailed explanation thereof will be omitted.

The present embodiment is different from the fifth embodiment in terms of the method for the image conversion after the analysis (S602) for determining whether an image is a target of high quality printing.

First, in S601, as with S101, the album creation application 50 displays the image arrangement screen 20 and the image selection screen 30, and the image data selected by the user from among an image group is arranged in the image slot 21 selected by the user on the image arrangement screen 20. After image data is selected and arranged, in a case when the user places an order, the image data and the image slots corresponding thereto are confirmed.

In S602, as with S102 (S1021 through S1029 in FIG. 3), the album creation application 50 analyzes the image data arranged in the respective image slots 21 included in the album data for which the order is confirmed, so as to determine whether each of the image data is a target image of high quality printing or not.

In S603, the album creation application 50 selectively provides an identification flag to image data that is a target of high quality printing, which is included in the album data, based on the analysis result.

In S604, the album creation application 50 sends the album data to the external server 1002, which is a management server, without performing image conversion to the image data.

Thereafter, in S605, an application installed on the external server 1002 checks the presence or absence of an identification flag in the image data group included in the sent album data.

In S606, the application installed on the external server 1002 selectively performs downsampling for decreasing the resolution of an image to image data that is not a target of high quality printing out of the entire image data included in the album data, based on the identification flag.

In S607, the application installed on the external server 1002 sends the album data, which includes the image data to which the image conversion has been selectively performed, to a printer such as the printer 1001.

Lastly, in S608, the printer 1001 performs printing by use of the album data including the downsampled image data, so as to complete an album as a product.

Details of the image analysis step in S602, which corresponds to characteristics of the technology of the present disclosure, is the same as those that have already explained in the first embodiment with reference to FIG. 3, and therefore detailed explanations thereof are omitted.

As described above, in the information processing system according to the present embodiment, the image conversion (downsampling) for decreasing the resolution is performed only to an image that is not a target of high quality printing, and the other images are used with the original resolutions without performing the image conversion. Accordingly, it possible to create a high definition album and to shorten the processing time for transferring the album data and for the image conversion as well. Furthermore, by reducing the data size of the album data, it is possible to reduce the management cost since the storage capacity of the management server can be reduced.

In this way, the present embodiment is configured to be implemented by the album creation application 50 included in the information processing apparatus 1004 and the application included in the external server 1002, which is a management server, cooperating with each other.

Note that, in the sixth embodiment, as with the first embodiment, after an order of an album is confirmed in S601, the process of S602 (as well as the process of S603, depending on the determination result of S602) is executed for each image in the album. However, as with the first embodiment, for example, it is also possible that the processes of S602 and S603 are executed in a state when images can be replaced.

Note that, although the configurations of the above-described six embodiments are explained with an example of creating an album (a photo album, a photo book), the embodiments are not limited to creation of an album, and the embodiments are applicable to print systems and information processing systems for printing an image in general.

Furthermore, although each of the embodiments has a configuration in which upsampling or downsampling is performed, there may be such a configuration in which both upsampling and downsampling are performed. That is, it is also possible that upsampling is performed on image data determined to be a target of high quality printing and downsampling is performed on image data determined not to be a target of high quality printing.

Furthermore, although explanations have been given of the examples in which a target image for high quality printing is determined and a flag is added to the target image for high quality printing in the processing illustrated in FIGS. 9 through 12, the embodiments are not limited to as such. For example, it is also possible that an image that is not a target of high quality printing is determined and a flag is added to the image that is not a target of high quality printing. Then, in the device to which the image and the flag are sent, upsampling is performed on images to which the flag is not added, and downsampling is performed to images to which the flag is added. That is, any kind of information can be used as long as the image that is a target of changing the pixel value can be identified in the device to which the image is sent.

Creation of a high definition printed product using high-resolution image data by the above-described processing such as upsampling and the processing time thereof are in a trade-off relationship. Therefore, in a case when high quality image data is used for all the images necessary for creating a photo album, the usability is sometimes deteriorated since the processing time for data transfer and the waiting time for the user become long.

On the other hand, according to the technology of the present disclosure as in the above-described six embodiments, the resolution conversion is selectively performed based on whether an image is appropriate for high quality printing or not, so as to improve the image quality of the image and to optimize the data size of the entire image group. As a result, it is possible to create a high definition album and to implement shortening of the time for resolution conversion and shortening of the time for data transfer in the procedure of creating an album. As described above, it is possible to provide an information processing system that achieves both improvement of image quality and usability in album creation, etc.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technology of the present disclosure, it is possible to shorten the processing time for creating a high quality album.

What is claimed is:

1. An information processing method comprising:
    an image analyzing step for analyzing characteristics of each of a plurality of images to be used for album data;
    a first sending step for sending the plurality of images and information that is based on an analysis result of the image analyzing step;
    an image converting step for changing pixel counts of an image of which the characteristics satisfy a predetermined condition, based on the information sent in the first sending step, out of the plurality of images sent in the first sending step; and
    a second sending step for sending album data including the image with pixel counts changed in the image converting step,
    wherein the image analyzing step and the first sending step are executed by a first apparatus, and, in the first sending step, the first apparatus sends the plurality of images and the information via the Internet, and
    wherein the image converting step and the second sending step are executed by a second apparatus, the second apparatus being a server.

2. The information processing method according to claim 1, wherein the first apparatus sends the plurality of images and information indicating the image of which the characteristics satisfy the predetermined condition out of the plurality of images to the second apparatus, and
    wherein, out of the plurality of images, the second apparatus changes the pixel counts of the image of which the characteristics satisfy the predetermined condition, which is indicated by the sent information.

3. The information processing method according to claim 1, wherein, in the image converting step, processing for increasing pixel counts is executed for the image of which the characteristics satisfy the predetermined condition.

4. The information processing method according to claim 3, wherein the characteristics represent whether or not the image includes an image of nature, and
    wherein, in a case when the image includes an image of nature, image conversion for increasing the pixel counts of the image is performed in the image converting step.

5. The information processing method according to claim 3, wherein the characteristics represent a frequency component of the image, and
    wherein, in a case when a high frequency component of the image is equal to or higher than a threshold value, image conversion for increasing the pixel counts of the image is performed in the image converting step.

6. The information processing method according to claim 3, wherein the characteristics represent photographic information recorded in the image at the time of image-capturing, and wherein, in a case when the photographic information indicates that the image is captured by using a predetermined camera or lens, image conversion for increasing the pixel counts of the image is performed in the image converting step.

7. The information processing method according to claim 3, wherein the characteristics represent whether or not the image is selected by a user, and
wherein, in a case when the image is selected by the user, image conversion for increasing the pixel counts of the image is performed in the image converting step.

8. The information processing method according to claim 3, wherein the characteristics represent whether or not the image includes a predetermined face image, and
wherein, in a case when the image includes the predetermined face image, image conversion for increasing the pixel counts of the image is performed in the image converting step.

9. The information processing method according to claim 3, wherein the characteristics represent whether or not the image includes a face image with the predetermined expression, and
wherein, in a case when the image includes a face image with the predetermined expression, image conversion for increasing the pixel counts of the image is performed in the image converting step.

10. The information processing method according to claim 3, wherein the characteristics represent whether or not the image is obtained from a social networking service (SNS), and
wherein, in a case when the image is obtained from an SNS, image conversion for increasing the pixel counts of the image is performed in the image converting step.

11. The information processing method according to claim 3, wherein the characteristics represent whether or not the image is to be arranged on a cover of the album, and
wherein, in a case when the image is to be arranged on a cover of the album, image conversion for increasing the pixel counts of the image is performed in the image converting step.

12. The information processing method according to claim 3, wherein the characteristics represent a resolution of the image at the time of being arranged in the album, and
wherein, in a case when the resolution is lower than a threshold value, image conversion for increasing the pixel counts of the image is performed in the image converting step.

13. The information processing method according to claim 1, wherein, in the image converting step, processing for decreasing pixel counts is executed for the image of which the characteristics satisfy the predetermined condition.

14. The information processing method according to claim 1, wherein, in the image converting step, one of processing for increasing pixel counts and processing for decreasing pixel counts is executed for a first image of which the characteristics satisfy the predetermined condition, and one of the processing for increasing pixel counts and the processing for decreasing pixel counts that is not executed for the first image is executed for a second image of which the characteristics do not satisfy the predetermined condition.

15. An image processing apparatus comprising:
at least one processor operatively coupled to a memory, serving as:
a receiving unit configured to receive, from an external apparatus, a plurality of images to be used for album data and information indicating an image whose characteristics satisfy a predetermined condition out of the plurality of images;
an image converting unit configured to change pixel counts of the image whose characteristics satisfy the predetermined condition, based on the information received by the receiving unit, out of the plurality of images received by the receiving unit; and
a sending unit configured to send album data in which the plurality of images including the image with pixel counts changed by the image converting unit are arranged,
wherein the image processing apparatus is a server, and
wherein the receiving unit receives the plurality of images and the information sent by the external apparatus via the Internet.

16. A non-transitory computer readable storage medium storing a program causing a computer to function as:
an image analyzing unit configured to analyze characteristics of each of a plurality of images to be used for album data; and
a sending unit configured to send, to an external server different from the computer, the plurality of images and information indicating an image of which the characteristics satisfy a predetermined condition out of the plurality of images, based on an analysis result from the image analyzing unit,
wherein processing for changing pixel counts is executed by the external server for the image of which the characteristics satisfy the predetermined condition out of the plurality of images sent by the sending unit, the image being indicated by the information sent by the sending unit, and
wherein the sending unit sends the plurality of images and the information via the Internet.

* * * * *